US007150336B2

(12) United States Patent
Desmarais (10) Patent No.: US 7,150,336 B2
(45) Date of Patent: Dec. 19, 2006

(54) MULTI-COMPONENT ISOLATION UNIT FOR A SNOWMOBILE

(75) Inventor: Jean-Francois Desmarais, Racine (CA)

(73) Assignee: Bombardier Recreational Products, Inc., Valcourt (CA)

( * ) Notice: Subject to any disclaimer, the term of this patent is extended or adjusted under 35 U.S.C. 154(b) by 0 days.

(21) Appl. No.: 11/041,778

(22) Filed: Jan. 22, 2005

(65) Prior Publication Data

US 2006/0162976 A1   Jul. 27, 2006

(51) Int. Cl.
B62M 27/02 (2006.01)
B62M 29/02 (2006.01)
B62D 23/00 (2006.01)

(52) U.S. Cl. .................. 180/190; 180/3.9; 296/35.1; 296/35.3

(58) Field of Classification Search ............... 180/190; 294/35.1, 35.3
See application file for complete search history.

(56) References Cited

U.S. PATENT DOCUMENTS

| 4,311,204 | A | * | 1/1982 | Shupert | 180/54.1 |
| 4,620,604 | A | * | 11/1986 | Talbot | 180/190 |
| 4,892,165 | A | * | 1/1990 | Yasui et al. | 180/190 |
| 5,219,439 | A | * | 6/1993 | Moore et al. | 296/35.1 |
| 5,791,431 | A | * | 8/1998 | Asao et al. | 180/311 |
| 6,155,374 | A | * | 12/2000 | Uchida | 180/309 |
| 6,874,590 | B1 | * | 4/2005 | Rondeau et al. | 180/89.1 |
| 6,926,107 | B1 | * | 8/2005 | Nishijima | 180/190 |
| 2002/0179356 | A1 | * | 12/2002 | Morii et al. | 180/190 |
| 2004/0069558 | A1 | * | 4/2004 | Ebert | 180/346 |
| 2004/0104062 | A1 | * | 6/2004 | Bedard et al. | 180/190 |
| 2004/0154850 | A1 | * | 8/2004 | Pyykonen | 180/190 |

* cited by examiner

Primary Examiner—Lesley D. Morris
Assistant Examiner—Marlon Arce-Diaz
(74) Attorney, Agent, or Firm—Osler, Hoskin & Harcourt LLP (57) ABSTRACT

A isolation unit for a snowmobile connects to the forward frame members of the snowmobile and provides a plurality of receptacles and mounting points for receiving and securing various front-end components to the snowmobile. The isolation unit not only facilitates assembly and maintenance of the snowmobile but also protects and isolates vibration-sensitive components from the vibrations of the engine. The isolation unit is molded from plastic to accommodate a variety of components, including a hood, a console, a headlight, an ignition coil, fuel tank vent pipe, stepper motor, a km/MPH converter, an electrical wire harness, an electronic control unit, an exhaust pipe temperature sensor wires, a fuse box, an engine reverse buzzer, and a capacitor.

18 Claims, 7 Drawing Sheets

MULTI-COMPONENT ISOLATION UNIT FOR A SNOWMOBILE

FIELD OF THE INVENTION

The present invention generally relates to a snowmobile and, more particularly, to a multi-component isolation unit for clustering and securing front-end components to a snowmobile, and isolating them from vibration.

BACKGROUND OF THE INVENTION

Under the hood of a snowmobile are many different electrical components that need to be securely attached so that they do not jostle around during operation of the vehicle. Amongst others, these components could include headlights, an ignition coil, a fuel tank vent pipe, a stepper motor, a km/MPH converter, an electrical wire harness, an electronic control unit (ECU), exhaust pipe temperature sensor wires, a fuse box, an engine reverse buzzer, a capacitor, etc.

In the past, these components were typically attached either directly to the engine, to the hood, to a portion of the snowmobile frame or to other parts of the snowmobile that were immovable. Typically, these components needed a specialized bracket to hold them securely in place. Alternatively, hose clamps or threaded fasteners such as screws would be used to fasten the components in place. In any event, prior-art snowmobiles required a number of brackets, screws and tie wraps which take quite a lot of time to attach during assembly of the vehicle, therefore increasing the cost of the vehicle. Furthermore, during maintenance of the vehicle, these components take a lot of time to disassemble, which again represents additional costs and time loss to the end-user.

Moreover, some of the front-end components are sensitive to vibrations, such as motors used to drive valves. One prior-art technique for isolating vibration-sensitive components is described in U.S. Pat. No. 6,227,323 (Ashida) entitled EXHAUST CONTROL SYSTEM FOR SNOWMOBILE ENGINE. Ashida teaches that a drive motor for the exhaust valves is attached to a portion of the frame (e.g. the steering column, the bumber, etc.) rather than directly to the engine in order to reduce engine vibrations transmitted to the vibration-sensitive drive motor. However, as will be appreciated by those of ordinary skill in the art, vibration-sensitive components attached to the frame will still experience vibrations through the frame (although usually not in the same frequency range and not of the same magnitude as the engine vibrations).

Therefore, it would be highly desirable to provide a snowmobile in which front-end components are quickly and easily assembled and disassembled and where these components are at least partially isolated from the deleterious effects of engine and frame vibrations.

SUMMARY OF THE INVENTION

It is an object of the present invention to provide a multi-component isolating and clustering unit for a snowmobile that overcomes at least one of the deficiencies of the prior art as described above.

In accordance with one aspect of the present invention, a isolation unit for securing various snowmobile components to a snowmobile includes at least two connectors for securely connecting the isolation unit to a frame of the snowmobile; and a unitary body extending between the connectors, the unitary body having a plurality of mounting points for securing the various snowmobile components to the cluster unit.

In accordance with another aspect of the present invention, a snowmobile includes a frame including a tunnel; an engine disposed on the frame; a drive track disposed below and supported by the tunnel and operatively connected to the engine for propulsion of the snowmobile; two steerable skis disposed on the frame, each via a front suspension; a straddle seat disposed on the tunnel above the drive track and rearward of the engine; and an isolation unit as described in the preceding paragraph.

Other features and advantages of the present invention will be better understood with reference to the preferred embodiment described hereinafter.

BRIEF DESCRIPTION OF THE DRAWINGS

Having thus generally described the nature of the present invention, reference will now be made to the accompanying drawings by way of illustration showing a preferred embodiment, in which.

DETAILED DESCRIPTION OF THE PREFERRED EMBODIMENT

Figure 1:
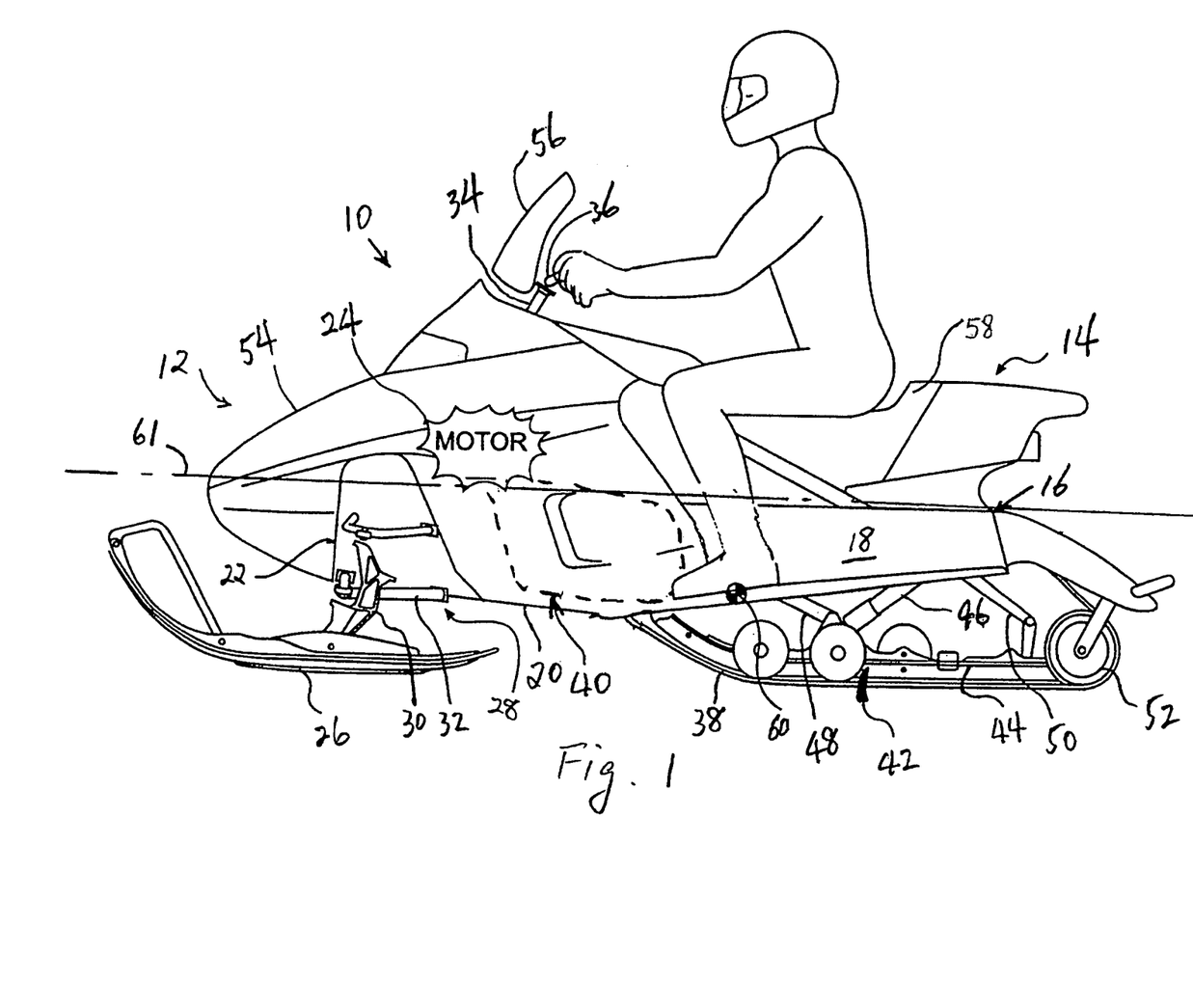
FIG. 1 is a side view of a snowmobile incorporating an embodiment of the present invention.

Referring now to FIG. 1, a snowmobile incorporating an embodiment of the present invention is designated generally by reference numeral 10. Although certain aspects of the present invention are applicable in other types of vehicles, the present invention has particular utility in connection with snowmobiles.

The snowmobile 10 includes a forward end 12 and a rearward end 14 which are defined consistently with a travel direction of the vehicle. The snowmobile 10 includes a frame or chassis 16 which normally includes a rear tunnel 18, an engine cradle portion 20 and a front suspension assembly portion 22. An engine 24, which is schematically illustrated in FIG. 1, is carried by the engine cradle portion 20 of the frame 16. A ski and steering assembly (not indicated) is provided, in which two skis 26 are positioned at the forward end 12 of the snowmobile 10 and are attached to the front suspension assembly portion 22 of the frame 16 through a front suspension assembly 28. The front suspension assembly 28 includes ski legs 30, supporting arms 32 and ball joints (not shown) for operatively joining the respective ski legs 30, supporting arms 32 and a steering column 34. The steering column 34 at its upper end is attached to a steering device such as a handlebar 36 which is positioned forward of a rider and behind the engine 24 to rotate the ski legs 30 and thus the skis 26, in order to steer the vehicle.

An endless drive track 38 is positioned at the rear end 14 of the snowmobile 10 and is disposed under tunnel 18, being connected operatively to the engine 24 through a belt transmission system 40 which is schematically illustrated by broken lines in FIG. 1. Thus, the endless drive track 38 is driven to run about a rear suspension assembly 42 for propulsion of the snowmobile 10. The rear suspension assembly 42 includes a pair of slide rails 44 in sliding contact with the endless drive track 38. The rear suspension assembly 42 also includes one or more shock absorbers 46 which may further include a coil spring (not shown) surrounding the individual shock absorbers 46. Front and rear suspension arms 48 and 50 are provided to attach the slide rails 44 to the frame (chassis) 16. One or more idler wheels 52 are also provided in the rear suspension assembly 42.

At the front end 12 of the snowmobile 10, fairings 54 enclose the engine 24 and the belt transmission system 40, thereby providing an external shell that not only protects the engine 24 and the belt transmission system 40, but can also be decorated to make the snowmobile 10 more aesthetically pleasing. Typically, the fairings 54 include a hood (not indicated) and one or more side panels which can be opened to allow access to the engine 24 and the belt transmission system 40 when this is required, for example, for inspection or maintenance of the engine 24 and/or the belt transmission system 40. In the particular snowmobile 10 shown in FIG. 1, the side panels can be opened along a vertical axis to swing away from the snowmobile 10. A windshield 56 may be connected to the fairings 54 near the front end 12 of the snowmobile 10 or directly to the handlebar 36. The windshield 56 acts as a wind screen to lessen the force of the air on the rider while the snowmobile 10 is moving.

The engine 24 is a type of internal combustion engine that is supported on the frame 16 and is located at the engine cradle portion 20. The internal construction of the engine 24 may be of any known type, however the engine 24 drives an engine output shaft 29 that rotates about a horizontally/laterally disposed axis that extends generally transversely to a longitudinal centerline 61 extending in a front to rear direction of the snowmobile 10. The engine output shaft 29 drives the belt transmission system 40 for transmitting torque to the endless drive track 38 for propulsion of the snowmobile 10.

A straddle-type seat 58 is positioned atop the frame 16 and extends from the rear end 14 of the snowmobile 10 to the fairings 54. A rear portion of the seat 58 may include a storage compartment or can be used to accommodate a passenger seat (not indicated). Two footrests 60 are positioned on opposite sides of the snowmobile 10 below the seat 58 to accommodate the driver's feet.

Figure 2:
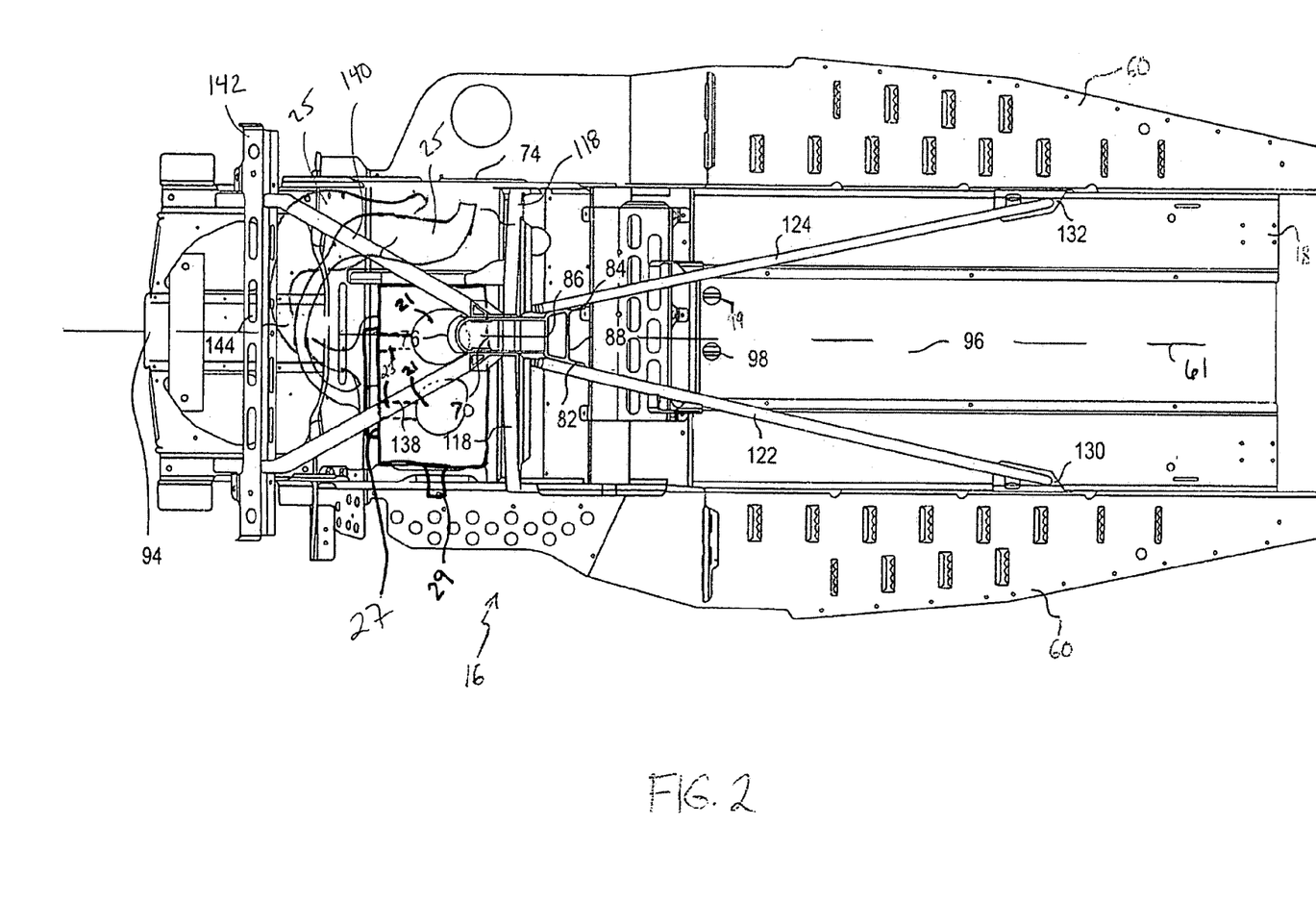
FIG. 2 is a top plan view of a snowmobile frame to which can be secured a multi-component isolation unit in accordance with an embodiment of the present invention.

FIG. 2 is a top plan view of a snowmobile frame to which can be secured a multi-component isolation unit in accordance with an embodiment of the present invention. It should be expressly understood that the snowmobile frame described herein is illustrative of one type of frame to which the multi-component isolation unit can be attached. The isolation unit can be attached to other types of frames with minor modifications that would be well within the scope of a person of ordinary skill in the art.

As shown in FIG. 2, the snowmobile frame 16 includes a tunnel 18 and side footrests 60, as was already described above. The frame 16 also includes a front sub-frame 94 to which the front suspension arms are mounted, as is well known in the art. The frame 16 further includes a rear left brace 122 and a rear right brace 124 which extend upwardly and forwardly from the tunnel 18 to a variable geometry steering bracket 70 which defines the apex of the frame's generally pyramidal structure. Left and right brackets 130, 132 secure the left and right braces 122, 124 to the tunnel 18. As shown, the tunnel 18 extends forwardly to form an engine cradle wall 74. The tunnel also includes an integrated radiator 96 having an inlet 98 and an outlet 99.

As further illustrated in FIG. 2, the frame 16 also includes lateral support members 118 which extend upwardly and inwardly from the engine cradle wall 74. The lateral support members 118 also connect to the variable geometry steering bracket 70. In addition, a front left brace 138 and a front right brace 140 extend upwardly and rearwardly to the apex of the frame's pyramidal structure where they too connect to the variable geometry steering bracket 70. The front left brace 138 and the front right brace 140 are also connected at their forward ends by a cross-member 142, which includes a plurality of weight-reducing holes 144.

As shown in FIG. 2, the variable geometry steering bracket 70 has a rounded forward end 76 and a square rear end 86. Left and right legs 82, 84 extend rearwardly from the variable geometry steering bracket 70. A cross member 88 extends between the left and right legs 82, 84 and provide suitable attachments and proper clearance for a variable geometry steering shaft, as is described in greater detail in United States Patent Application Publication 2004/0040064 A1 entitled FRAME CONSTRUCTION FOR A VEHICLE, which is hereby incorporated by reference in its entirety.

Figure 5:
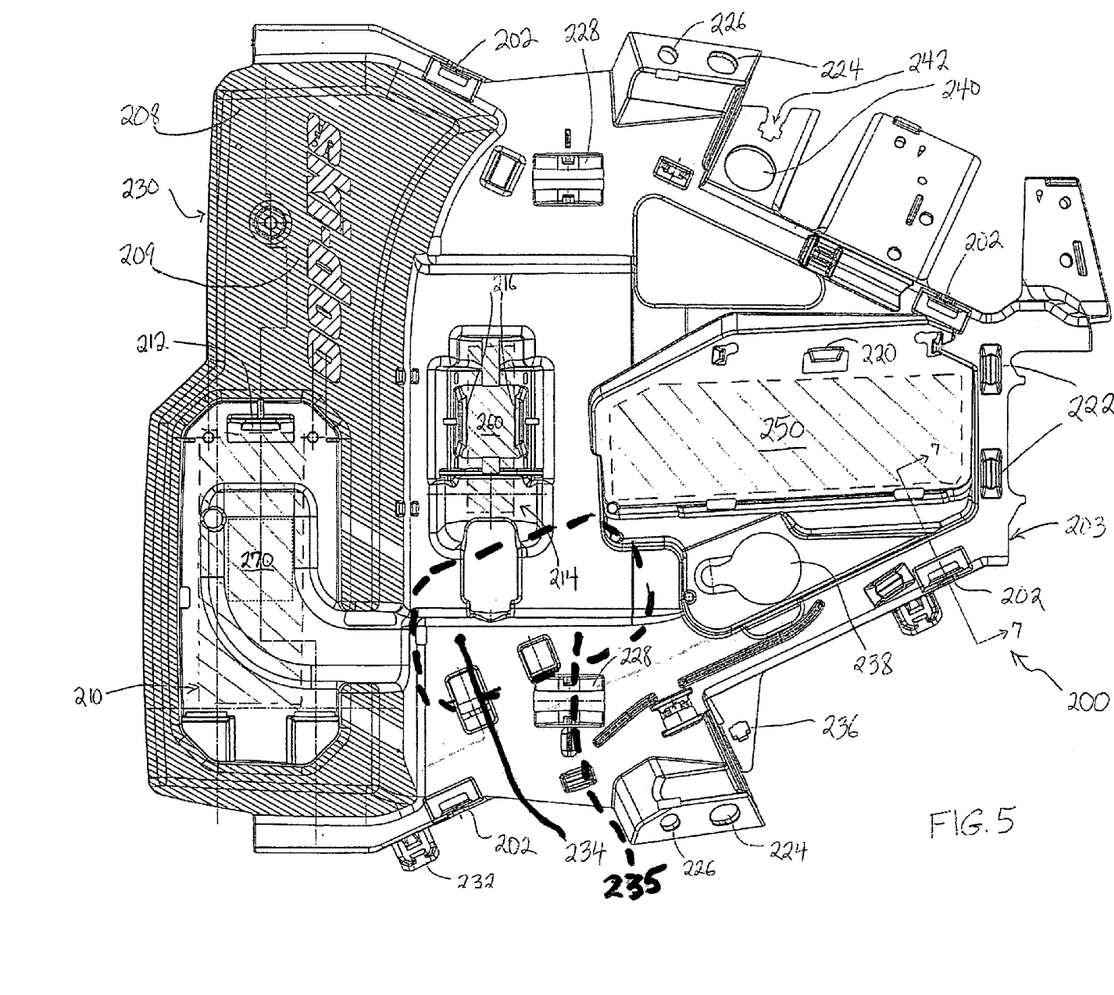
FIG. 5 is a top plan view of the multi-component isolation unit in accordance with the preferred embodiment of the present invention.

Also shown in FIG. 2 is the engine body 24 with combustion chambers 21. Exhaust passages 23 lead from the combustion chambers 21 to exhaust pipes 25 to exhaust the exhaust gases to the atmosphere. The exhaust pipes leading from the exhaust passage along a first side of the engine to one side of the centerline 61. A valve member 27 moveably mounted with respect to the engine body 24 controls the flow of exhaust gases through the exhaust passages 23. A means, preferably a stepper motor 235, the placement of which is best shown in FIG. 5, is connected to the valve member 27 to control the flow of exhaust gases through the exhaust passages. The stepper motor 235 is connected to the underside of the multi-component isolation unit to better isolate the stepper motor from vibrations as will be described below.

Figure 3:
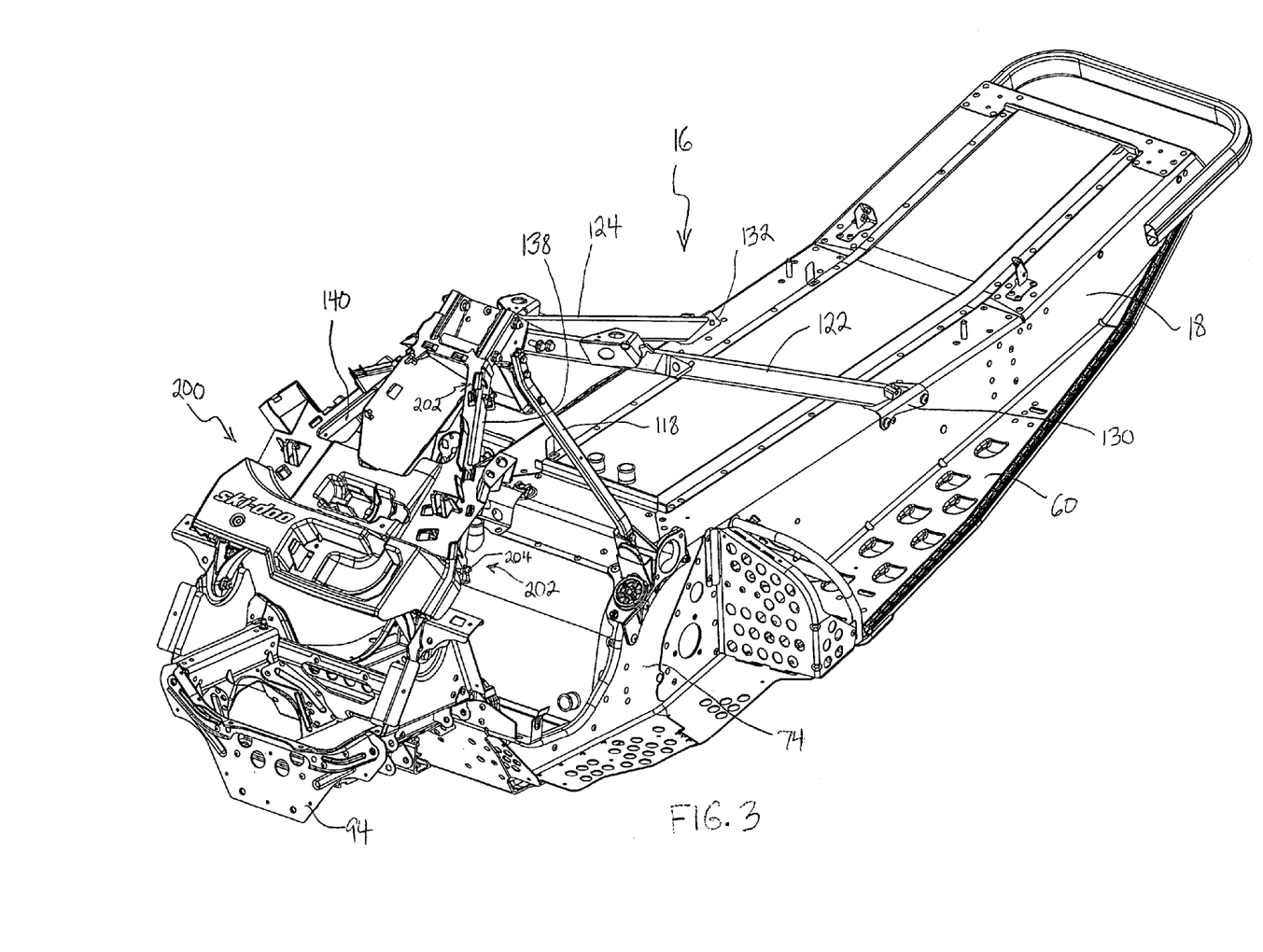
FIG. 3 is an isometric perspective view of a snowmobile frame with a multi-component isolation unit attached thereto in accordance with a preferred embodiment of the present invention.

FIG. 3 is an isometric perspective view of a multi-component isolation unit 200 secured to the frame 16 of the snowmobile in accordance with a preferred embodiment of the present invention. The frame 16 is substantially the same frame as illustrated in FIG. 2, having a tunnel 18, side footrests 60, an engine cradle side wall 74, and a forward sub-frame 94 for supporting front suspension arms (not shown). The frame 16 has left and right front braces 138, 140, a pair of lateral support members 118, and left and right rear braces 122, 124 (anchored by respective brackets 130, 132). These six frame members together form a generally pyramidal frame structure.

As shown in FIG. 3, the multi-component isolation unit 200 is preferably secured to the front left brace 138 and to the front right brace 140 via a plurality of connectors to ensure a stable connection of the isolation unit to the frame. In the preferred embodiment, the isolation unit is secured to each of the two frame members via two connectors, for a total of four unit-to-frame connections. As will be readily appreciated by those of ordinary skill in the art, any number of connections can be provided as long as a suitable secure connection between the isolation unit and frame is achieved. Although the isolation unit is preferably attached to the front left and right braces, the isolation unit could also be attached to other frame members or, in the case of a different frame designs, to other or non-analogous portions of the frame. It should therefore be understood that the precise manner in which the isolation unit is attached to the frame can be achieved in any number of ways without departing from the scope and spirit of the present invention.

As shown in FIG. 3, in the preferred embodiment, the isolation unit 200 includes upside-down U-shaped channels which fit onto the frame members which, in this preferred embodiment, have a square or rectangular cross-section such as that of a box beam. Because the two front frame members 138, 140 diverge as they extend toward the front of the vehicle, the isolation unit, once connected to the frame members, will naturally be precluded from sliding down the frame members.

As further illustrated in FIG. 3, the isolation unit 200 includes two pairs of connectors 202 for securely connecting the isolation unit 200 to the front frame members 138, 140. In the preferred embodiment, the connectors 202 are clips having lower hooks 204. Once the isolation unit 200 is located precisely in place, the lower hook 204 is forced (or "snapped") into locking engagement with a bottom portion of the frame member. To detach the isolation unit from the frame members, the method of assembly is reversed, i.e. for each of the clips, the lower hook 204 is forced outwardly from the frame member and then the lower hook 204 is unhooked from the frame member.

In the preferred embodiment, to further secure the isolation unit to the frame, the connectors of the isolation unit are supplemented by a plurality of threaded fasteners. The isolation unit can include several notches 205 for receiving and guiding the threaded fasteners 206 (which are preferably screws) into respective holes in the frame. As will be appreciated by those of ordinary skill in the art, the connectors used to secure the isolation unit to the frame need not be clips supplemented by screws. Other known types of mechanical connectors or fasteners can be employed to affix the isolation unit to the frame members.

Figure 4:
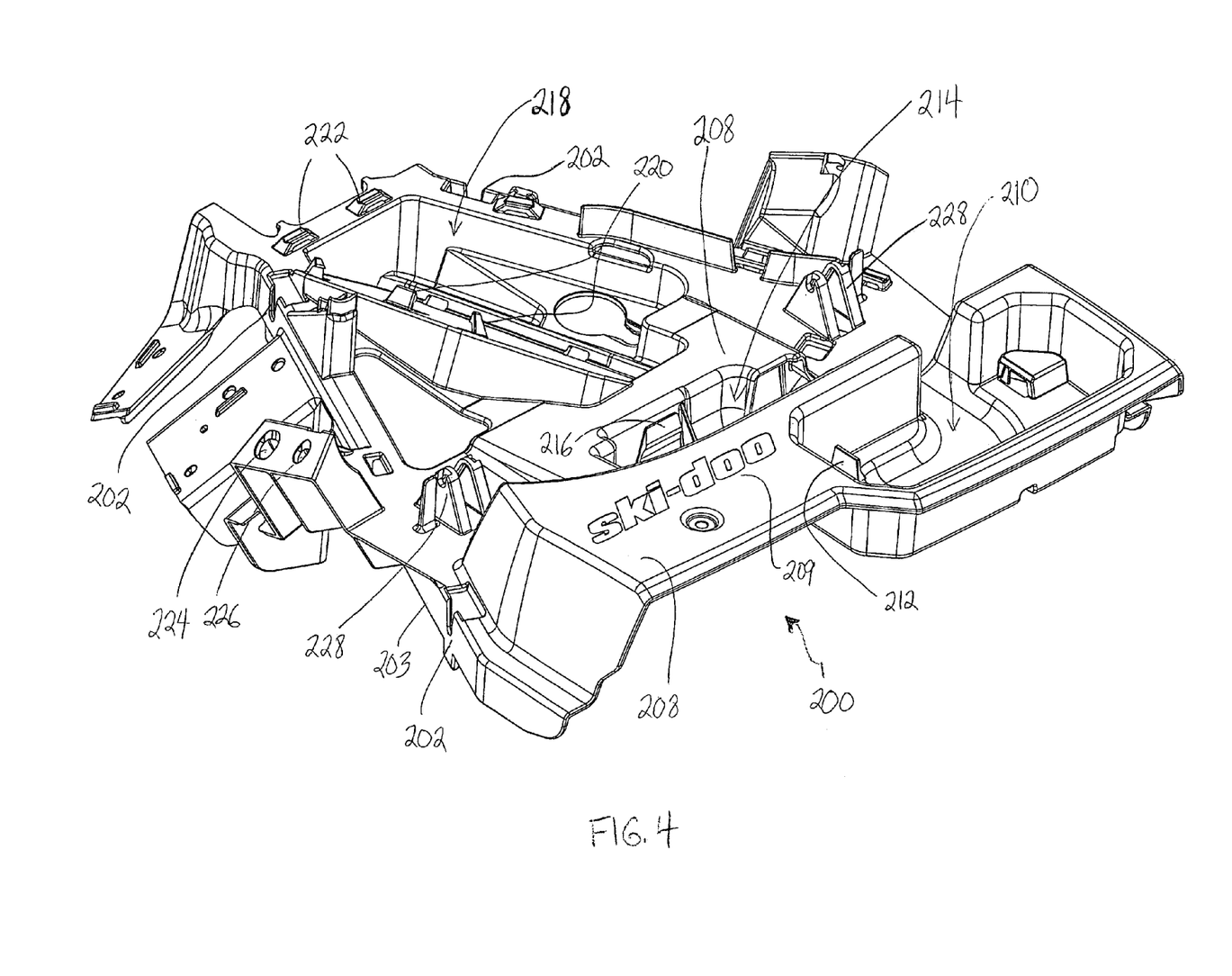
FIG. 4 is an isometric perspective view of the top side of a multi-component isolation unit in accordance with the preferred embodiment of the present invention.

FIG. 4 is an isometric perspective view of the top side of a multi-component isolation unit 200 in accordance with the preferred embodiment of the present invention. As shown in FIG. 4, the isolation unit 200 is molded to have a plurality of cavities and embosses defining various receptacles individually molded to receive particular front-end components of the snowmobile, examples of which will be provided below. These receptacles permit various front-end components to be stowed in a space-efficient manner. The receptacles also include mounting points or anchoring points, e.g. clips, connections or other fastening devices, which are located either in the respective receptacle or adjacent to the respective receptacle for securing the components in their respective receptacles. Mounting points are provided for such components as a hood, a console, a headlight, an ignition coil, fuel tank vent pipe, stepper motor, a km/MPH converter, an electrical wire harness, an electronic control unit, exhaust pipe temperature sensor wires, a fuse box, an engine reverse buzzer, and a capacitor, as will be elaborated below with reference to subsequent figures. The isolation unit not only securely stores the components in a space-efficient manner but also isolates them from the pernicious effects of engine vibrations. The multi-component isolation unit also allows components to be easily and quickly attached and detached (for maintenance). Since a substantial number of screws and tie-wraps are eliminated by the present invention, the time to assemble and disassemble the front end of the snowmobile is dramatically improved, resulting in lower overall costs for both manufacturing and maintenance.

As shown in FIG. 4, the multi-component isolation unit 200 includes a number of raised surfaces ("embosses") 208 upon which warning stickers can be affixed or upon which a logo, trademark or other writing 209 can be further embossed. The isolation unit 200, also includes a plurality of cavities, recesses or receptacles for receiving various components. For example, as shown in FIG. 4, the isolation unit 200 includes a fuse box receptacle 210 for receiving a fuse box. The fuse box receptacle 210 includes a fuse box isolation clip 212 for anchoring the fuse box within the fuse box receptacle 210.

As further illustrated in FIG. 4, the isolation unit 200 includes a capacitor receptacle 214 for receiving a capacitor. The capacitor receptacle 214 includes at least one isolation point, e.g. a capacitor-restraining clip 216 which facilitates isolation of the capacitor inside the capacitor receptacle 214.

FIG. 4 also shows that the isolation unit includes an ECU receptacle 218 for receiving an electronic control unit (ECU) which is restrained by quick-release clips 220. Immediately rearward of the ECU receptacle is a pair of electrical wire harness holders 222. Furthermore, on either side of the isolation unit 200 are console and hood mounting points 224, 226, respectively. As shown in FIG. 4, the isolation unit 200 further includes a pair of headlight attachments 228, i.e. mounting points for snowmobile headlights, which can be easily detached and replaced when burned out.

Finally, as already described above, the isolation unit 200 includes clips 202 for securely connecting the isolation unit to the frame members of the frame of the snowmobile. FIG. 4 also shows the upside-down U-shaped channels 203 which fit onto respective portions of the frame members. The channels ensure an easy and stable fit between the isolation unit and the frame.

The isolation unit 200 is preferably molded of a thermoset polymer, e.g. a plastic with suitable mechanical properties in terms of heat-resistance, durability and vibration dampening, to name but a few of the design considerations that a person of ordinary of skill would consider when selecting an appropriate polymer for the isolation unit.

It should be noted that the multi-component isolation unit is also known as a "multi-function plate" as the unit performs a multiplicity of component-anchoring functions and acts as a barrier for vibrations transmitted through the frame members 138, 140.

FIG. 5 is a top plan view of the multi-component isolation unit 200 in accordance with the preferred embodiment of the present invention. FIG. 5 shows many of the same mounting points as were illustrated in FIG. 4, such as the clips 202 and the upside-down U-shaped channels 203 for connecting the isolation unit to the frame members, the main embosses 208, the trademark/logo emboss 209, the electrical wired harness holders 222, the console isolation point 224, the hood isolation point 226, and the headlight attachments 228.

Also illustrated in FIG. 5 is an ignition coil isolation point 230 which is anchored to the underside of the isolation unit. FIG. 5 also shows that the isolation unit has a fuel tank vent pipe isolation point 232 and a stepper motor isolation area 234. The stepper motor 235 is preferably mounted on the underside of the isolation unit although it can also be mounted to the topside.

As shown in FIG. 5, the isolation unit 200 further includes mounting points for a km/mph converter 236 and a headlight adjuster 238. Mounting/anchoring points are also provided for an engine reverse buzzer 240 and an exhaust pipe temperature sensor 242. FIG. 5 also shows an ECU (electronic control unit) 250 mounted to the isolation unit 200, a capacitor 260 installed in the capacitor receptacle of the isolation unit and a fuse box 270 installed in the fuse box receptacle of the isolation unit.

Figure 6:
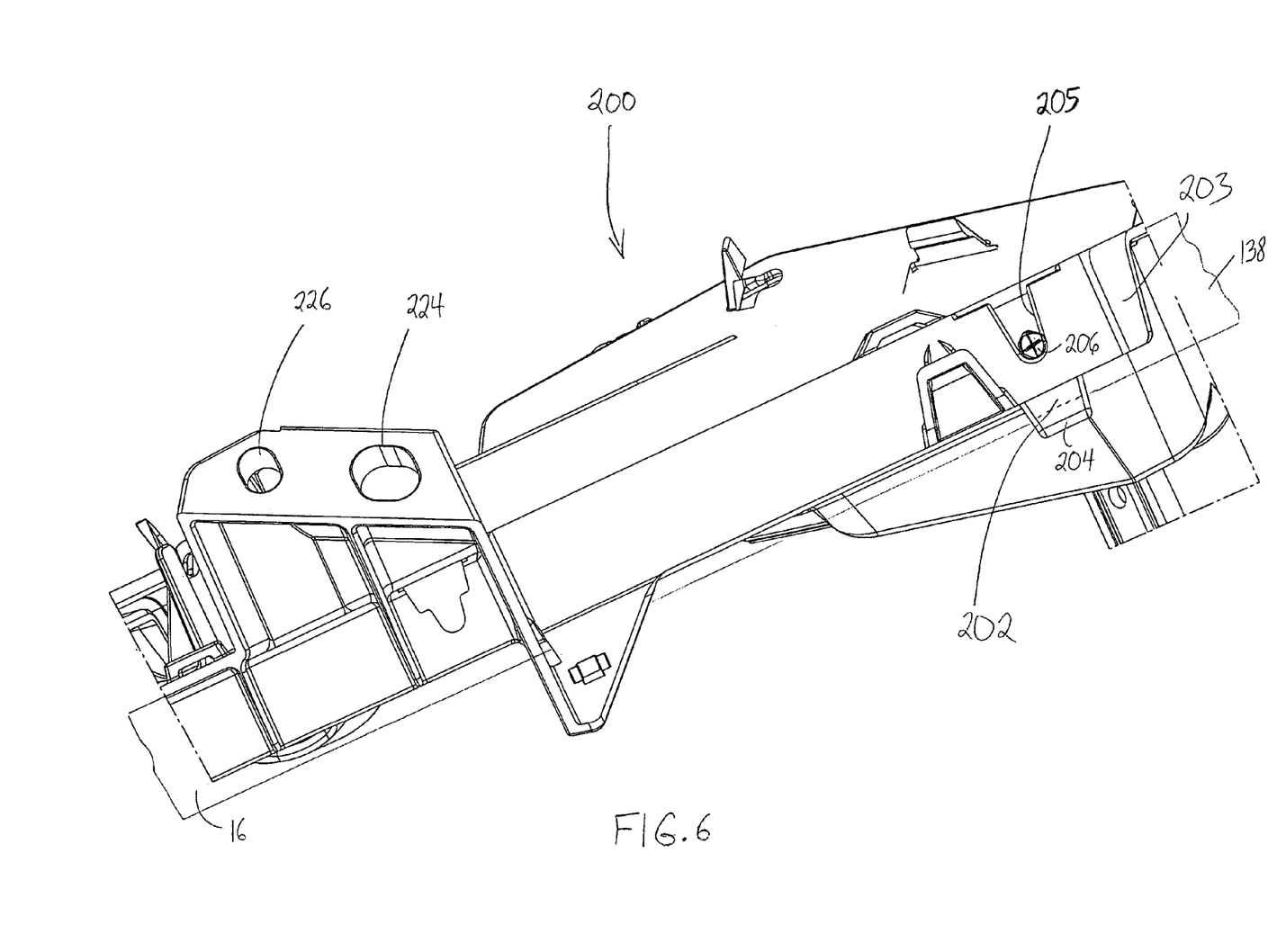
FIG. 6 is a partial side view of the multi-component isolation unit in accordance with the preferred embodiment of the present invention.
Figure 7:
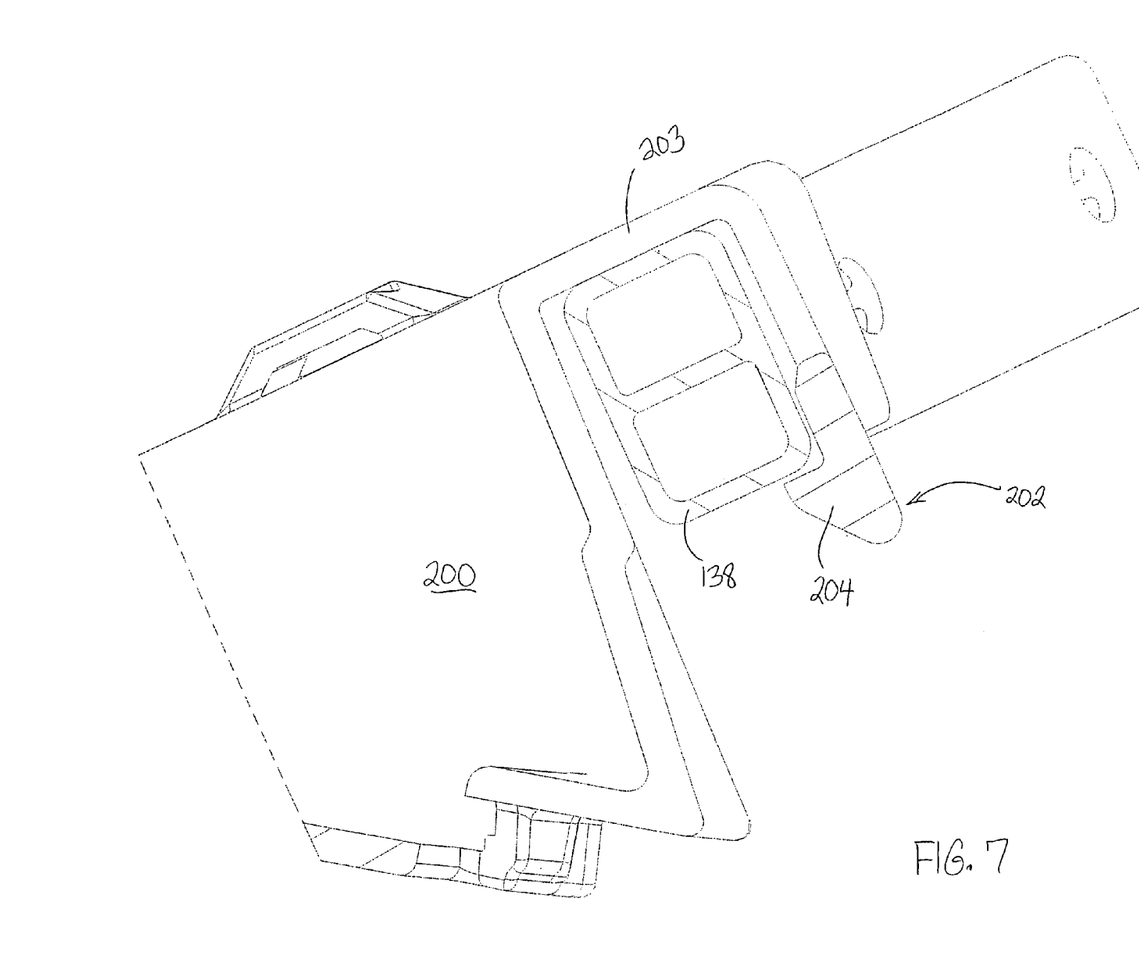
FIG. 7 is a cross-sectional view, taken along section 7—7 of FIG. 6, showing the upside-down U-shaped channel and connector clip used to secure the isolation unit to one of the frame members.

FIG. 6 is a partial side view of the multi-component isolation unit in accordance with the preferred embodiment of the present invention. As shown in FIG. 6, the multi-component isolation unit 200 connects to the frame 16 (i.e., to the frame members 138, 140 as described above) via clips 202 and an upside-down U-shaped channel 203, which are also shown in FIG. 7. FIG. 7 is a cross-sectional view taken through section 7—7 of FIG. 6 showing how the upside-down U-shaped channel 203, clip 202 and lower hook 204 cooperate to connect the isolation unit 200 to one of the frame members 138.

To further secure the multi-component isolation unit 200 to the frame, or frame members 138, 140, notches 205 are provided in the isolation unit 200 through which threaded fasteners 206, such as screws, can be inserted.

The multi-component isolation unit thus provides a set of molded receptacles and attachment points for a number of front-end snowmobile components. Since the plastic isolation unit is secured to the frame, vibration-sensitive components are isolated from the pernicious effects of continual vibration. By providing precisely molded and quick-release attachment points, the multi-component isolation unit facilitates assembly of the front end of the snowmobile. Likewise, as the components secured to the isolation unit are easily detached, the isolation unit also simplifies maintenance of the vehicle.

Modifications and improvements to the above-described embodiment of the present invention may become apparent to those skilled in the art. The foregoing description is intended to be exemplary rather than limiting. The scope of the present invention is therefore intended to be limited solely by the scope of the appended claims.

I claim:

1. An isolation unit for securing various snowmobile components to a snowmobile and reducing snowmobile vibrations transmitted to the components, the isolation unit comprising:
   at least two connectors for securely connecting the isolation unit to a frame of the snowmobile; and
   a unitary body extending between the connectors, the unitary body having a plurality of mounting points for securing the various snowmobile components to the isolation unit;
   the at least two connectors each comprising a clip integrally formed with the unitary body of the isolation unit.

2. The isolation unit as claimed in claim 1 wherein the connectors comprise:
   a first connector for connecting the isolation unit to a first frame member; and
   a second connector for connecting the isolation unit to a second frame member, the first and second connectors being spaced apart on opposite sides of the unitary body of the isolation unit.

3. The isolation unit as claimed in claim 1 wherein the unitary body comprises a plurality of topside and underside receptacles for receiving the snowmobile components.

4. The isolation unit as claimed in claim 1 wherein the unitary body is molded from plastic to include a plurality of cavities and embosses individually configured to receive particular snowmobile components.

5. The isolation unit as claimed in claim 1 wherein one of said mounting points is adapted to hold a stepper motor.

6. The isolation unit as claimed in claim 5 wherein the stepper motor is attached to a topside of the isolation unit.

7. The isolation unit as claimed in claim 5 wherein the stepper motor is attached to an underside of the isolation unit.

8. The isolation unit as claimed in claim 1 further comprising a plurality of notches through which fasteners are received for further securing the isolation unit to the frame.

9. The isolation unit as claimed in claim 1 wherein the mounting points are adapted to receive any one or more of: a hood, a console, a headlight, an ignition coil, fuel tank vent pipe, stepper motor, a km/MPH converter, an electrical wire harness, an electronic control unit, an exhaust pipe temperature sensor wires, a fuse box, an engine reverse buzzer, and a capacitor.

10. A snowmobile comprising:
    a frame including a tunnel;
    an engine disposed on the frame;
    a drive track disposed below and supported by the tunnel and operatively connected to the engine for propulsion of the snowmobile;
    two steerable skis disposed on the frame, each via a front suspension;
    a straddle seat disposed on the tunnel above the drive track and rearward of the engine; and
    an isolation unit as claimed in claim 1 disposed on the frame.

11. The snowmobile as claimed in claim 10 wherein the connectors comprise:
    a first connector for connecting the isolation unit to a first frame member; and
    a second connector for connecting the isolation unit to a second frame member, the first and second connectors being spaced apart on opposite sides of the unitary body of the isolation unit.

12. The snowmobile as claimed in claim 10 wherein the unitary body comprises a plurality of topside and underside receptacles for receiving the snowmobile components.

13. The snowmobile as claimed in claim 10 wherein the unitary body is molded from plastic to include a plurality of cavities and embosses individually configured to receive particular snowmobile components.

14. The snowmobile as claimed in claim 10 wherein one of said mounting points is adapted to hold a stepper motor.

15. The snowmobile as claimed in claim 14 wherein the stepper motor is attached to an underside of the isolation unit.

16. The snowmobile as claimed in claim 10 further comprising a plurality of notches through which fasteners are received for further securing the isolation unit to the frame.

17. The snowmobile as claimed in claim 10 wherein the mounting points are adapted to receive any one or more of: a hood, a console, a headlight, an ignition coil, fuel tank vent pipe, stepper motor, a km/MPH converter, an electrical wire harness, an electronic control unit, an exhaust pipe temperature sensor wires, a fuse box, an engine reverse buzzer, and a capacitor.

18. A snowmobile comprising:
    a frame having a centerline in a front and rear direction, a drive track operatively below the frame for propulsion of the snowmobile, an engine supported by the frame, the engine having an output shaft extending generally perpendicular to the centerline of the snowmobile and at least one combustion chamber with an exhaust passage to permit the flow of exhaust gases from the combustion chamber to an exhaust pipe, wherein the exhaust pipe connects to the exhaust passage along a first side of the engine to one side of the centerline, a valve member moveably mounted to the engine body to control the flow of exhaust gases through the exhaust passage, and means for moving the valve member, the means including a stepper motor mounted to an isolation unit, the isolation unit extending between two upwardly and rearwardly extending brace members of a pyramidal frame structure of the snowmobile.

* * * * *